United States Patent
Hamano

(10) Patent No.: US 10,291,273 B2
(45) Date of Patent: *May 14, 2019

(54) DISTORTION CANCELLATION DEVICE AND METHOD

(71) Applicant: FUJITSU LIMITED, Kawasaki-shi, Kanagawa (JP)

(72) Inventor: Mitsuharu Hamano, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/899,405

(22) Filed: Feb. 20, 2018

(65) Prior Publication Data

US 2018/0316370 A1    Nov. 1, 2018

(30) Foreign Application Priority Data

Apr. 27, 2017 (JP) ................... 2017-088818

(51) Int. Cl.
*H04B 1/00* (2006.01)
*H04B 1/10* (2006.01)
(Continued)

(52) U.S. Cl.
CPC ......... *H04B 1/1036* (2013.01); *H04B 1/7075* (2013.01); *H04B 1/7093* (2013.01); *H04B 1/7095* (2013.01); *H04B 1/70735* (2013.01)

(58) Field of Classification Search
CPC .......... H04B 1/04; H04B 1/0475; H04B 1/10; H04B 1/109; H04B 1/1027; H04B 1/40;
(Continued)

(56) References Cited

U.S. PATENT DOCUMENTS 5,537,443 A    7/1996 Yoshino et al.
8,874,153 B2 * 10/2014 Bevan .................. H04B 1/1027
                                                 455/67.13

(Continued)

FOREIGN PATENT DOCUMENTS

JP    2008-532388 A    8/2008
JP    2015-530787 A    10/2015
(Continued)

OTHER PUBLICATIONS

U.S. Notice of Allowance dated Aug. 31, 2018 for copending U.S. Appl. No. 15/860,126, 13 pages.

(Continued)

*Primary Examiner* — Quochien B Vuong
(74) *Attorney, Agent, or Firm* — Fujitsu Patent Center

(57) ABSTRACT

There is provided a distortion cancellation device including a memory, and a processor coupled to the memory and the processor configured to, acquire a transmission signal to be wirelessly transmitted, acquire a reception signal to which an intermodulation signal generated due to the transmission signal wirelessly transmitted is added, generate a replica signal of the intermodulation signal from the transmission signal, detect an arrival time of the intermodulation signal, based on a correlation operation using a sample of a signal sequence of the replica signal and a sample of the acquired reception signal, the signal sequence having a duration corresponding to a detection range, and cancel the intermodulation signal in the reception signal, based on the detected arrival time.

8 Claims, 11 Drawing Sheets

(51) Int. Cl.
*H04B 1/7073* (2011.01)
*H04B 1/7095* (2011.01)
*H04B 1/7093* (2011.01)
*H04B 1/7075* (2011.01)

(58) Field of Classification Search
CPC ......... H04B 1/525; H04B 3/23; H04L 5/1461; H04L 25/03006
USPC ..... 455/63.1, 67.13, 295, 296; 375/346, 348
See application file for complete search history.

(56) References Cited

U.S. PATENT DOCUMENTS

| | | | |
|---|---|---|---|
| 8,917,792 B2 * | 12/2014 | Black | H04B 15/00 375/346 |
| 9,660,673 B2 | 5/2017 | Miao et al. | |
| 2006/0248564 A1 | 11/2006 | Zinevitch | |
| 2008/0092194 A1 | 4/2008 | Kim et al. | |
| 2011/0274226 A1 | 11/2011 | Takeuchi | |
| 2014/0036736 A1 | 2/2014 | Wyville | |
| 2015/0349814 A1 | 12/2015 | Hirai et al. | |
| 2017/0208598 A1 * | 7/2017 | Aoki | H04B 7/0413 |

FOREIGN PATENT DOCUMENTS

| | | |
|---|---|---|
| WO | 2010/082431 | 7/2010 |
| WO | 2014/083361 | 6/2014 |

OTHER PUBLICATIONS

U.S. Notice of Allowance dated Nov. 1, 2018 for copending U.S. Appl. No. 15/860,126, 13 pages. Please note all references cited herewith, were previously cited on Feb. 20, 2018 and Sep. 17, 2018.*.

* cited by examiner

DISTORTION CANCELLATION DEVICE AND METHOD

CROSS-REFERENCE TO RELATED APPLICATION

This application is based upon and claims the benefit of priority of the prior Japanese Patent Application No. 2017-088818, filed on Apr. 27, 2017, the entire contents of which are incorporated herein by reference.

FIELD

The embodiment discussed herein is related to a distortion cancellation device and a distortion cancellation method.

BACKGROUND

Technologies, such as carrier aggregation and multi-input multi-output (MIMO), have been introduced in recent years for the purpose of improving throughput in a wireless communication system. Carrier aggregation refers to a technology in which a base station device and a wireless terminal device communicate with each other using a plurality of carriers different in frequency. MIMO refers to a technology in which a transmitting side transmits different pieces of data from a plurality of transmitting antennas, and a receiving side derives pieces of data transmitted from respective transmitting antennas from signals received by a plurality of receiving antennas.

With the introduction of the technologies, various signals different in frequency are transmitted within and outside wireless communication devices, such as a base station device and a wireless terminal device. If a distortion source, such as metal, is present on a transmission channel for such signals, intermodulation between signals different in frequency causes passive intermodulation (PIM). That is, an intermodulation signal having a frequency which is the sum of or the difference between multiples of the frequencies of the signals is generated at the distortion source. If the frequency of an intermodulation signal is included in a reception frequency band of a wireless communication device, the intermodulation signal hampers demodulation and decoding of a reception signal to lower reception quality.

To curb a reduction in reception quality due to such an intermodulation signal, for example, the idea of approximately regenerating an intermodulation signal resulting from intermodulation between a transmission signal transmitted from a wireless communication device and an interference signal transmitted from a different wireless communication device and canceling the intermodulation signal included in a reception signal is under consideration.

An intermodulation signal (hereinafter referred to as a PIM signal) may be regenerated by computation. A PIM signal which is regenerated by computation is a replica of a PIM signal which is generated due to a plurality of transmission signals. A signal obtained by inverting the phase of the PIM signal is added to a reception signal, thereby canceling the PIM signal in the reception signal. Accurate estimation of when a PIM signal arrives is important in canceling the PIM signal.

International Publication Pamphlets Nos. WO 2014/083361 and WO 2010/082431 are examples of related art.

SUMMARY

According to an aspect of the invention, a distortion cancellation device includes a memory, and a processor coupled to the memory and the processor configured to, acquire a transmission signal to be wirelessly transmitted, acquire a reception signal to which an intermodulation signal generated due to the transmission signal wirelessly transmitted is added, generate a replica signal of the intermodulation signal from the transmission signal, detect an arrival time of the intermodulation signal, based on a correlation operation using a sample of a signal sequence of the replica signal and a sample of the acquired reception signal, the signal sequence having a duration corresponding to a detection range, and cancel the intermodulation signal in the reception signal, based on the detected arrival time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

If a sliding correlation operation is performed for PIM signal estimation, since the signal level of a PIM signal is lower than that of a reception signal, an enormous number of samples are used to accurately distinguish between a PIM signal and noise. However, an increase in the number of samples causes an increase in the storage size of a storage portion which stores samples, and device circuit size increases.

Practical examples of a distortion cancellation device and a distortion cancellation method disclosed in the present application will be described below in detail with reference to the drawings. Note that the present disclosure is not limited to the embodiment below.

A cancellation device in a wireless communication system according to a reference example will be described here before describing a distortion cancellation device (hereinafter referred to as a cancellation device) in a wireless communication system according to the embodiment.

Cancellation Device (Reference Example)

Figure 7:
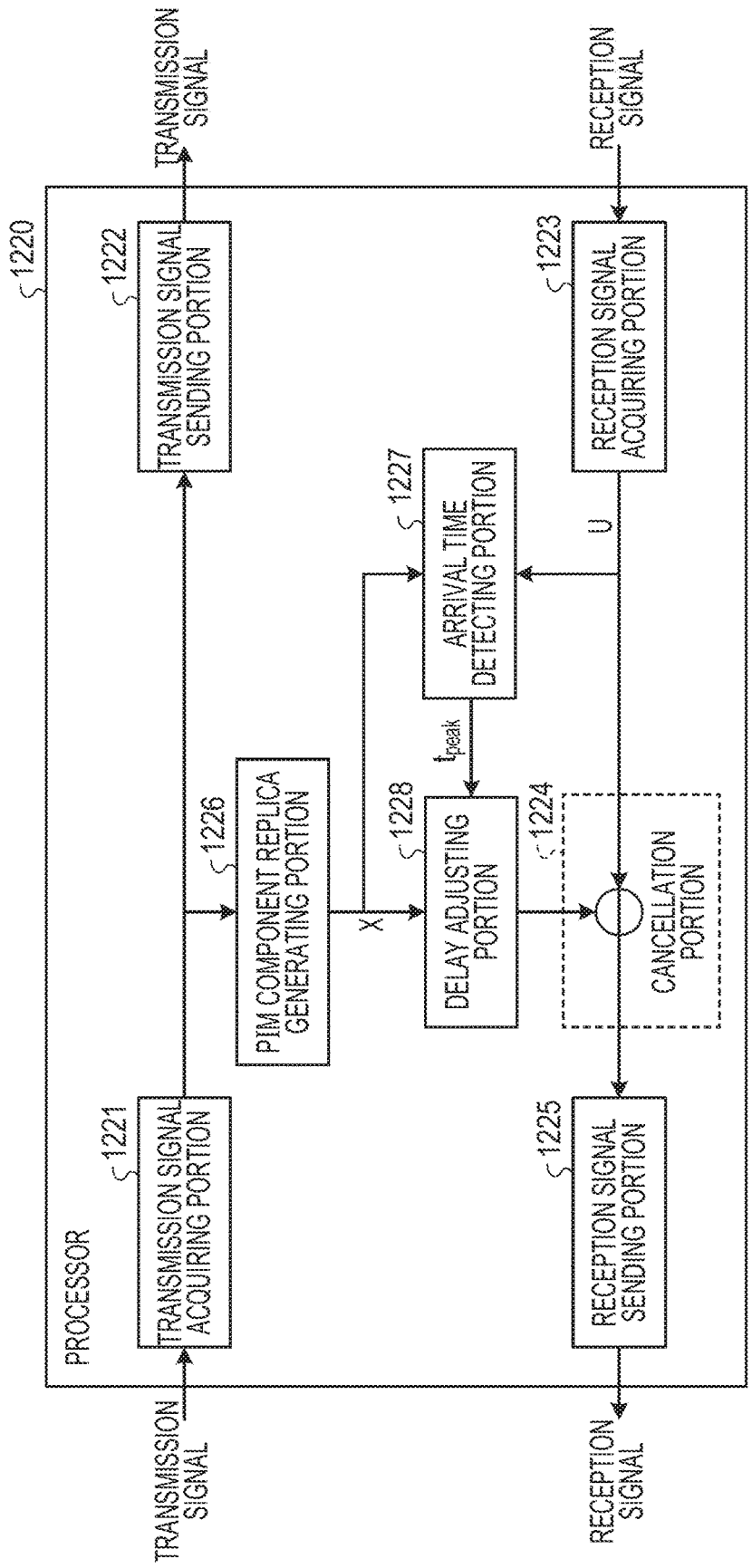
FIG. 7 is a block diagram illustrating one example of functions of a processor of a cancellation device in a wireless communication system according to a reference example.

FIG. 7 is a block diagram illustrating functions of a processor 1220 of the cancellation device in the wireless communication system according to the reference example. The processor 1220 includes a transmission signal acquiring portion 1221, a transmission signal sending portion 1222, a reception signal acquiring portion 1223, a cancellation portion 1224, a reception signal sending portion 1225, a PIM component replica generating portion 1226, an arrival time detecting portion 1227, and a delay adjusting portion 1228.

The transmission signal acquiring portion 1221 acquires a transmission signal received from a radio equipment control (REC) via, for example, an interface.

The transmission signal sending portion 1222 sends out the transmission signal acquired by the transmission signal acquiring portion 1221 to radio equipment (an RE) via an interface.

The reception signal acquiring portion 1223 acquires a reception signal U received from the RE via the interface. A PIM signal X which is generated due to intermodulation between transmission signals Tx1 and Tx2 has been added to the reception signal U acquired by the reception signal acquiring portion 1223.

The cancellation portion 1224 cancels the PIM signal X added to the reception signal U by adding a signal obtained by inverting the phase of a PIM signal X delay-adjusted by the delay adjusting portion 1228 to the reception signal U acquired by the reception signal acquiring portion 1223. For example, the cancellation portion 1224 includes a subtractor, and the subtractor subtracts the PIM signal X delay-adjusted by the delay adjusting portion 1228 from the reception signal U acquired by the reception signal acquiring portion 1223.

The reception signal sending portion 1225 sends out the reception signal U after the cancellation of the PIM signal X to the REC via the interface.

The PIM component replica generating portion 1226 makes a PIM signal X as a replica from transmission signals acquired by the transmission signal acquiring portion 1221. The PIM component replica generating portion 1226 sends out the replica PIM signal X to the arrival time detecting portion 1227 and the delay adjusting portion 1228.

The arrival time detecting portion 1227 computes a correlation value R(t) by expression (1) for a sliding correlation operation using the replica PIM signal X and a reception signal U. The arrival time detecting portion 1227 detects, as an arrival time for a PIM signal X, a time $t_{peak}$ when the correlation value R(t) has a significant peak value. Functions of the arrival time detecting portion 1227 will be described later in detail.

$$R(t) = \left| \sum_{s=0}^{N} U(s)\overline{X(s+t)} \right|^2 \quad (1)$$

The delay adjusting portion 1228 adjusts a delay in the replica PIM signal X based on the arrival time $t_{peak}$. The delay-adjusted replica PIM signal X is sent out to the cancellation portion 1224.

Arrival Time Detecting Portion (Reference Example)

Figure 8:
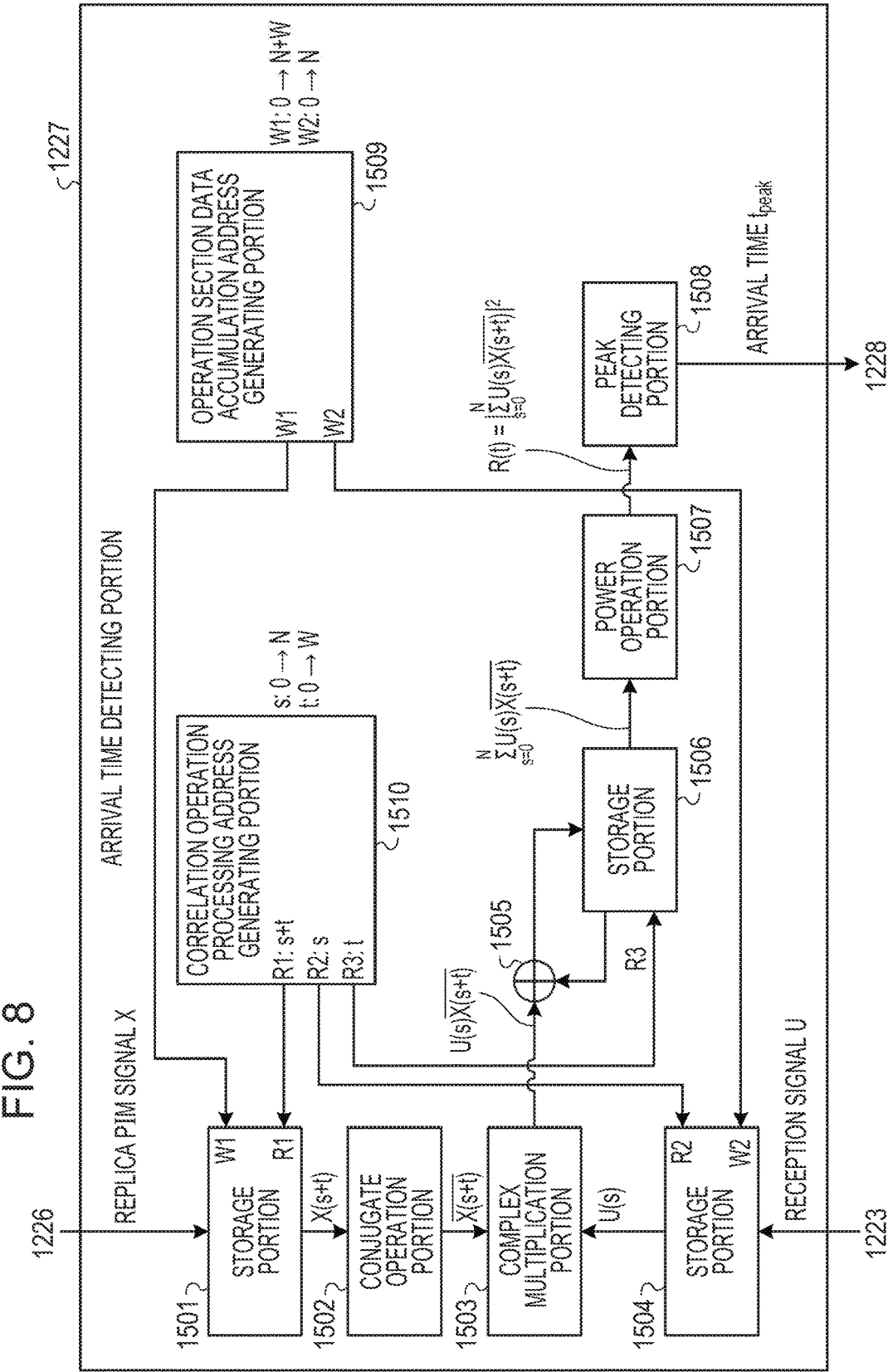
FIG. 8 is a block diagram illustrating one example of an arrival time detecting portion of the cancellation device in the wireless communication system according to the reference example.

FIG. 8 is a block diagram illustrating one example of the arrival time detecting portion 1227 of the cancellation device in the wireless communication system according to the reference example.

The arrival time detecting portion 1227 includes storage portions 1501, 1504, and 1506, a conjugate operation portion 1502, a complex multiplication portion 1503, an adder 1505, a power operation portion 1507, and a peak detecting portion 1508. The arrival time detecting portion 1227 also includes an operation section data accumulation address generating portion 1509 and a correlation operation processing address generating portion 1510. The storage portions 1501, 1504, and 1506 are, for example, random access memories (RAMs). Although the separate storage portions 1501, 1504, and 1506 are used as a storage portion for convenience of illustration, a plurality of storage portions do not have to be provided, and one storage portion may be provided.

Figure 9:
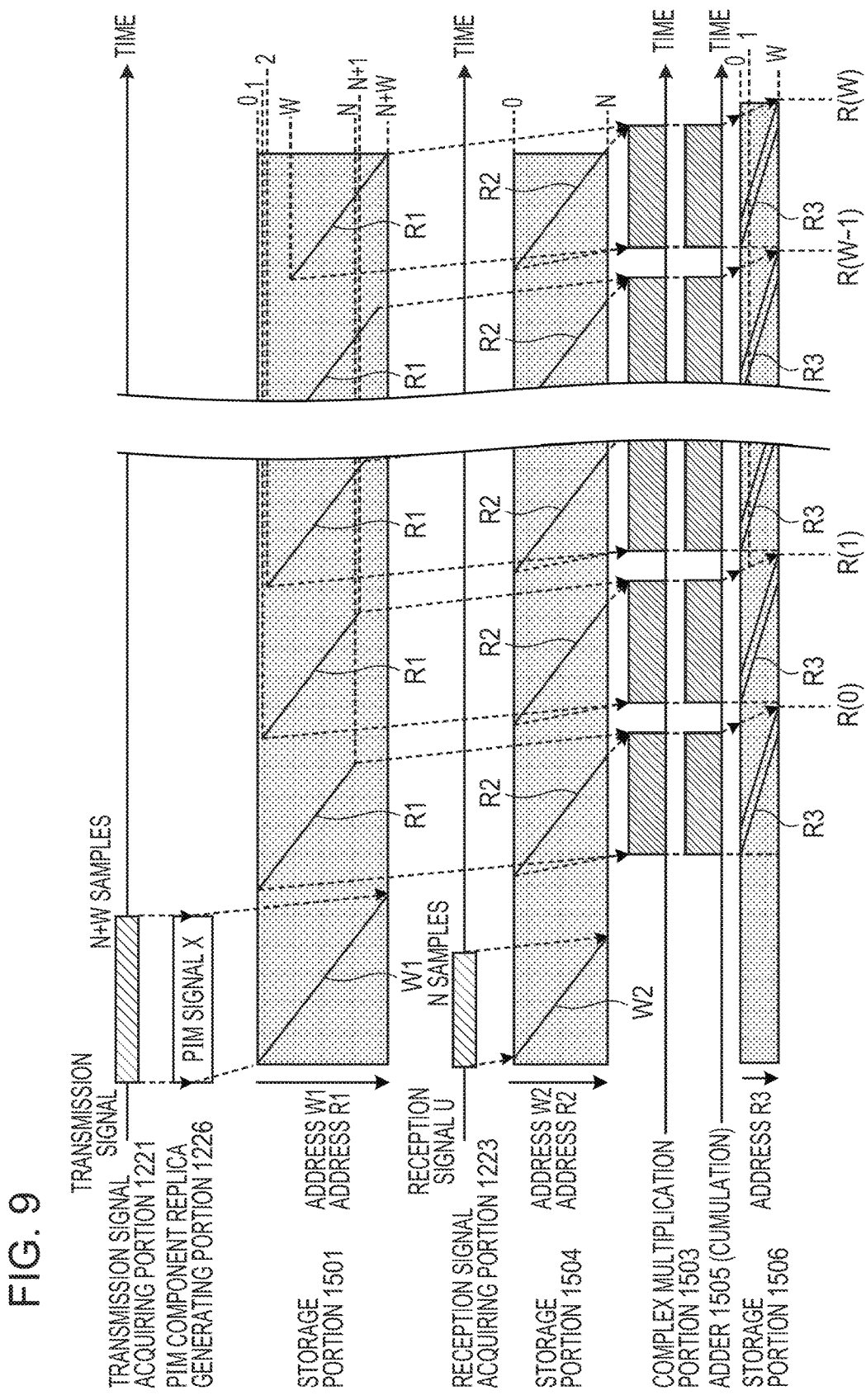
FIG. 9 is a timing diagram illustrating one example of an arrival time detection process according to the reference example.
Figure 10:
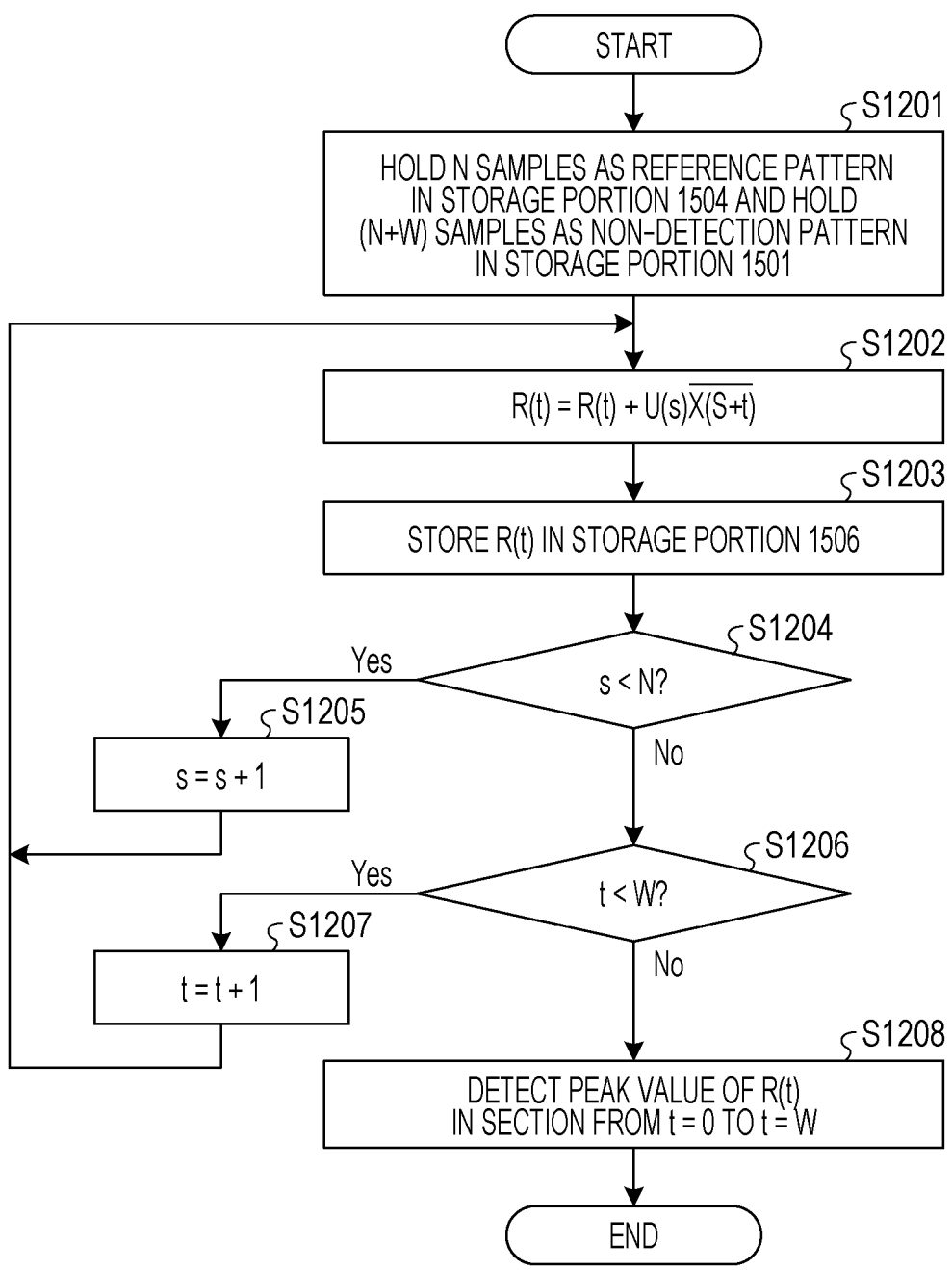
FIG. 10 is a flowchart illustrating the one example of the arrival time detection process according to the reference example.

A process (an arrival time detection process) by the components of the arrival time detecting portion 1227 will be described here with reference to FIGS. 9 and 10. FIG. 9 is a timing diagram illustrating one example of an arrival time detection process according to the reference example. FIG. 10 is a flowchart illustrating the one example of the arrival time detection process according to the reference example.

First, the arrival time detecting portion 1227 holds (N+W) samples as a non-detection pattern in the storage portion 1501 and holds N samples as a reference pattern in the storage portion 1504 (operation S1201).

More specifically, in operation S1201, the operation section data accumulation address generating portion 1509 generates, as a write address W1, each of 0th to (N+W)-th addresses. The operation section data accumulation address generating portion 1509 writes PIM signals X made as replicas by the PIM component replica generating portion 1226 as a signal sequence having a duration corresponding to a detection range from a 0th to an (N+W)-th into the storage portion 1501, using the write address W1. N denotes a set cumulative value, and W denotes a set delay amount (the detection range).

In operation S1201, the operation section data accumulation address generating portion 1509 generates, as a write address W2, each of a 0th address to an N-th address. The operation section data accumulation address generating portion 1509 writes reception signals U acquired by the reception signal acquiring portion 1223 as 0th to N-th reception signals U to the storage portion 1504, using the write address W2.

The arrival time detecting portion 1227 then computes a correlation value R(t) by expression (1) for a sliding correlation operation using an (s+t)-th PIM signal X stored in the storage portion 1501 and an s-th reception signal U stored in the storage portion 1504 (operation S1202).

More specifically, in operation S1202, the correlation operation processing address generating portion 1510 generates an (s+t)-th address as a read address R1. The correlation operation processing address generating portion 1510 then reads out the (s+t)-th PIM signal X among 0th to (N+W)-th PIM signals X written in the storage portion 1501, using the read address R1. s here denotes a cumulative value representing any one of 0 to N, and an initial value of the cumulative value s is 0. t denotes a delay amount representing any one of 0 to W, and an initial value of the delay amount t is 0. Hereinafter, the (s+t)-th PIM signal X read out from the storage portion 1501 will be referred to as a PIM signal X(s+t).

In operation S1202, the correlation operation processing address generating portion 1510 generates an s-th address as a read address R2. The correlation operation processing address generating portion 1510 then reads out an s-th reception signal U among the 0th to N-th reception signals U written in the storage portion 1504, using the read address R2. Hereinafter, the s-th reception signal U read out from the storage portion 1504 will be referred to as a reception signal U(s).

In operation S1202, the correlation operation processing address generating portion 1510 generates a t-th address as a read address R3. The correlation operation processing address generating portion 1510 then reads out the t-th correlation value R(t) from the storage portion 1506, using the read address R3.

In operation S1202, the conjugate operation portion 1502 performs a conjugate operation on the PIM signal X(s+t) read out from the storage portion 1501. The complex multiplication portion 1503 multiplies the PIM signal X(s+t) subjected to the conjugate operation by the conjugate operation portion 1502 and the reception signal U(s) read out from the storage portion 1504 and outputs the product to the adder 1505.

In operation S1202, the adder 1505 adds the t-th correlation value R(t) read out from the storage portion 1506 to the product output from the complex multiplication portion 1503 and updates the correlation value R(t) with the sum. The storage portion 1506 then stores the correlation value R(t) updated by the adder 1505 (operation S1203).

The correlation operation processing address generating portion 1510 then judges whether the cumulative value s is smaller than the set cumulative value N (operation S1204).

If the cumulative value s is smaller than the set cumulative value N (Yes in operation S1204), the correlation operation processing address generating portion 1510 increments the cumulative value s by 1 (operation S1205). In this case, operations S1202 to S1204 described above are performed.

On the other hand, if the cumulative value s is equal to the set cumulative value N (No in operation S1204), a correlation value R(0) when t=0 is computed, as illustrated in, for example, FIG. 9. In this case, the correlation operation processing address generating portion 1510 judges whether the delay amount t is smaller than the set delay amount W (operation S1206).

If the delay amount t is smaller than the set delay amount W (Yes in operation S1206), the correlation operation processing address generating portion 1510 increments the delay amount t by 1 (operation S1207). In this case, operations S1202 to S1206 described above are performed.

On the other hand, if the delay amount t is equal to the set delay amount W (No in operation S1206), a correlation value R(W) when t=W is computed, as illustrated in FIG. 9. In this case, an arrival time for a PIM signal X is detected (operation S1208).

More specifically, in operation S1208, the power operation portion 1507 obtains an absolute value of each element of a signal sequence of the correlation value R(t) (t=0 to W) written in the storage portion 1506, that is, each of the correlation values R(0) to R(W) and calculates the power of the absolute value. The peak detecting portion 1508 detects, as the arrival time for a PIM signal X, a time $t_{peak}$ corresponding to the correlation value R(t) having a significant peak value among the correlation values R(0) to R(W) in a section from t=0 to t=W (the detection range).

For this reason, the delay adjusting portion 1228 adjusts a delay in a PIM signal X made as a replica based on an arrival time $t_{peak}$. The cancellation portion 1224 then cancels a PIM signal X added to a reception signal U acquired by the reception signal acquiring portion 1223 by adding a signal obtained by inverting the phase of the PIM signal X delay-adjusted by the delay adjusting portion 1228 to the reception signal U.

In the arrival time detection process according to the reference example, a sliding correlation operation is performed to detect a PIM signal X added to a reception signal U. Since the signal level of a PIM signal X is lower than that of a reception signal U, an enormous number of samples are used to distinguish between a PIM signal X and noise. That is, the set cumulative value N is preferably large.

However, an increase in the set cumulative value N causes an increase in the storage sizes of the storage portions 1501 and 1504 in the arrival time detection process according to the reference example, and device circuit size increases.

Figure 11:
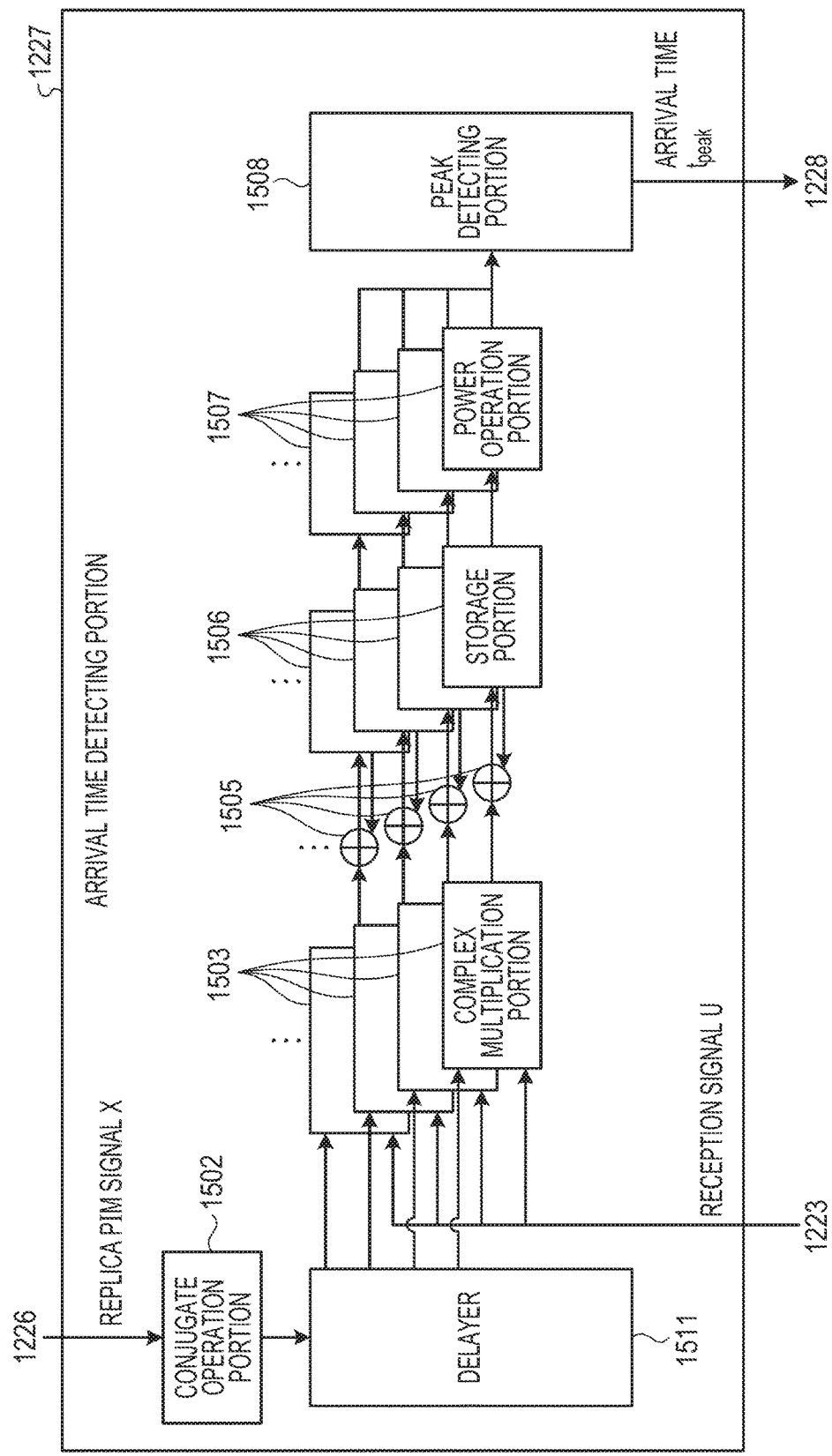
FIG. 11 is a block diagram illustrating another example of the arrival time detecting portion of the cancellation device in the wireless communication system according to the reference example.

If implementation of provision of the storage portions 1501 and 1504 large in storage size is difficult, some of the components of the arrival time detecting portion 1227 may be provided in parallel so as to implement a sliding correlation operation in real time. For example, as illustrated in FIG. 11, W complex multiplication portions 1503, W adders 1505, W storage portions 1506, and W power operation portions 1507 may be provided in parallel, and a delayer 1511 may be provided between the conjugate operation portion 1502 and the plurality of complex multiplication portions 1503.

Even in this case, however, the device circuit size increases due to the plurality of complex multiplication portions 1503, the plurality of adders 1505, the plurality of storage portions 1506, and the plurality of power operation portions 1507.

Embodiment

A cancellation device in a wireless communication system according to an embodiment will next be described. The wireless communication system according to the embodiment will be described first.

[Wireless Communication System]

Figure 1:
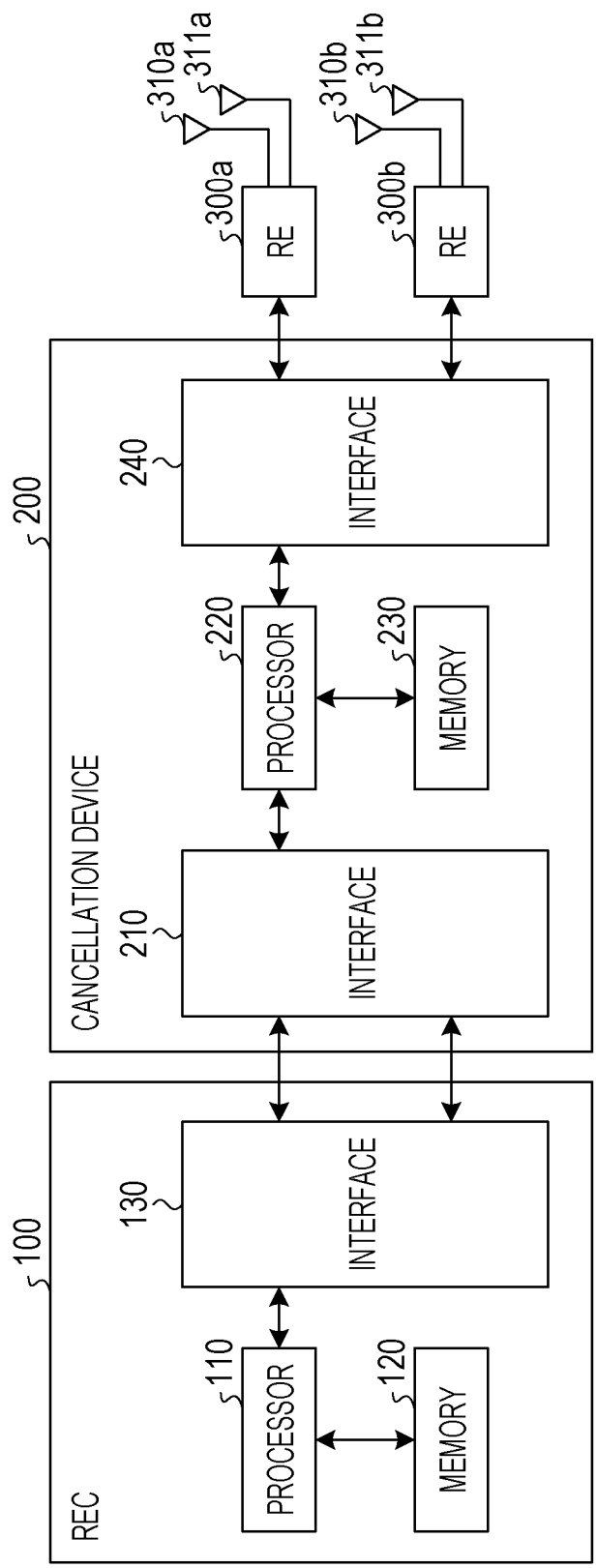
FIG. 1 is a block diagram illustrating one example of the configuration of a wireless communication system according to an embodiment.

FIG. 1 is a block diagram illustrating one example of the configuration of the wireless communication system according to the embodiment. The wireless communication system according to the embodiment includes a radio equipment control (REC) 100, a cancellation device 200, and radio equipment (an RE) 300a and radio equipment (an RE) 300b. Note that although the two REs 300a and 300b are illustrated in FIG. 1, one or three or more REs may be connected to the cancellation device 200. Although one REC is illustrated, two or more RECs may be connected to the cancellation device 200. Additionally, the cancellation device 200 may be included in the REC 100 or an RE 300. A device including the cancellation device 200 may be a wireless communication device.

The REC 100 executes baseband processing and transmits a baseband signal including transmission data to the cancellation device 200. The REC 100 receives a baseband signal including receive data from the cancellation device 200 and performs baseband processing on the baseband signal. More specifically, the REC 100 includes a processor 110, a memory 120, and an interface 130.

The processor 110 includes, for example, a central processing unit (CPU), a field programmable gate array (FPGA), a digital signal processor (DSP), or the like and generates transmission signals to be transmitted from the REs 300a and 300b, respectively. In the present embodiment, a case will be described as an example where the RE 300a transmits transmission signals at frequencies f1 and f2 different from each other from two antennas 310a and 311a while the RE 300b transmits transmission signals at frequencies f3 and f4 different from each other from two antennas 310b and 311b. For this reason, the processor 110 generates transmission signals Tx1 and Tx2 to be transmitted from the two antennas 310a and 311a, respectively, of the RE 300a and generates transmission signals Tx3 and Tx4 to be transmitted from the two antennas 310b and 311b, respectively, of the RE 300b. The processor 110 also obtains pieces of receive data from reception signals received by the REs 300a and 300b.

The memory 120 includes, for example, a random access memory (RAM), a read only memory (ROM), or the like and stores information used by the processor 110 to execute processing.

The interface 130 is connected to the cancellation device 200 via, for example, an optical fiber and transmits or receives baseband signals to or from the cancellation device 200. Baseband signals to be transmitted by the interface 130 include the transmission signals Tx1, Tx2, Tx3, and Tx4 described above.

The cancellation device 200 is connected between the REC 100 and the REs 300a and 300b and relays baseband signals transmitted or received between the REC 100 and the REs 300a and 300b. The cancellation device 200 also regenerates an intermodulation signal (hereinafter referred to as a PIM signal) by an operation based on the transmission signals Tx1, Tx2, Tx3, and Tx4. A PIM signal regenerated by computation is a replica of a PIM signal which is generated due to a plurality of transmission signals. The cancellation device 200 cancels a PIM signal in a reception signal by adding a signal obtained by inverting the phase of the PIM signal to the reception signal.

Note that a high-order distortion (a third-order distortion, for example), such as a PIM signal, may be generated due to a single transmission signal, such as the transmission signal Tx1, or may be generated due to a plurality of transmission signals, such as the transmission signals Tx1 and Tx2 different in frequency. The present embodiment assumes that the transmission signals Tx1 and Tx2 are applied to a distortion source to generate a PIM signal as a high-order distortion and that the frequency of the PIM signal is included in a reception frequency band of the REs 300a and 300b. That is, the cancellation device 200 cancels the PIM signal generated due to intermodulation between the transmission signals Tx1 and Tx2 in a reception signal.

The cancellation device 200 includes interfaces 210 and 240, a processor 220, and a memory 230.

The interface 210 is connected to the REC 100 and transmits or receives baseband signals to or from the REC 100. That is, the interface 210 receives transmission signals generated by the processor 110 from the interface 130 of the REC 100. The interface 210 also transmits reception signals received by the REs 300a and 300b to the interface 130 of the REC 100.

The processor 220 includes, for example, a CPU, an FPGA, a DSP, or the like and generates a PIM signal based on a plurality of transmission signals received by the interface 210. The processor 220 also subtracts a PIM signal from a reception signal received by the interface 240 and cancels a PIM signal added to the reception signal. Functions of the processor 220 will be described later in detail.

The memory 230 includes, for example, a RAM or a ROM and stores information used by the processor 220 to execute processing. That is, the memory 230 stores, for example, a parameter and the like used by the processor 220 to generate a PIM signal.

The interface 240 is connected to the REs 300a and 300b via, for example, an optical fiber and transmits or receives baseband signals to or from the REs 300a and 300b. That is, the interface 240 transmits transmission signals received from the REC 100 to the REs 300a and 300b. The interface 240 also receives reception signals received by the REs 300a and 300b from the REs 300a and 300b. A PIM signal which is generated due to intermodulation between a signal at the frequency f1 and a signal at the frequency f2 has been added to each of reception signals received by the interface 240 from the REs 300a and 300b.

The REs 300a and 300b upconvert baseband signals received from the cancellation device 200 to the radio frequencies f1 to f4 and transmit the baseband signals via the antennas. That is, the RE 300a upconverts the transmission signals Tx1 and Tx2 to the frequencies f1 and f2, respectively, and transmits the transmission signals Tx1 and Tx2 from the antennas 310a and 311a. The RE 300b upconverts the transmission signals Tx3 and Tx4 to the frequencies f3 and f4, respectively, and transmits the transmission signals Tx3 and Tx4 from the antennas 310b and 311b. The REs 300a and 300b also downconvert reception signals received via the antennas to a baseband frequency and transmit the reception signals to the cancellation device 200. A PIM signal which is generated due to intermodulation between signals at the frequencies f1 and f2 has been added to each of reception signals received by the REs 300a and 300b.

[Cancellation Device]

Figure 2:
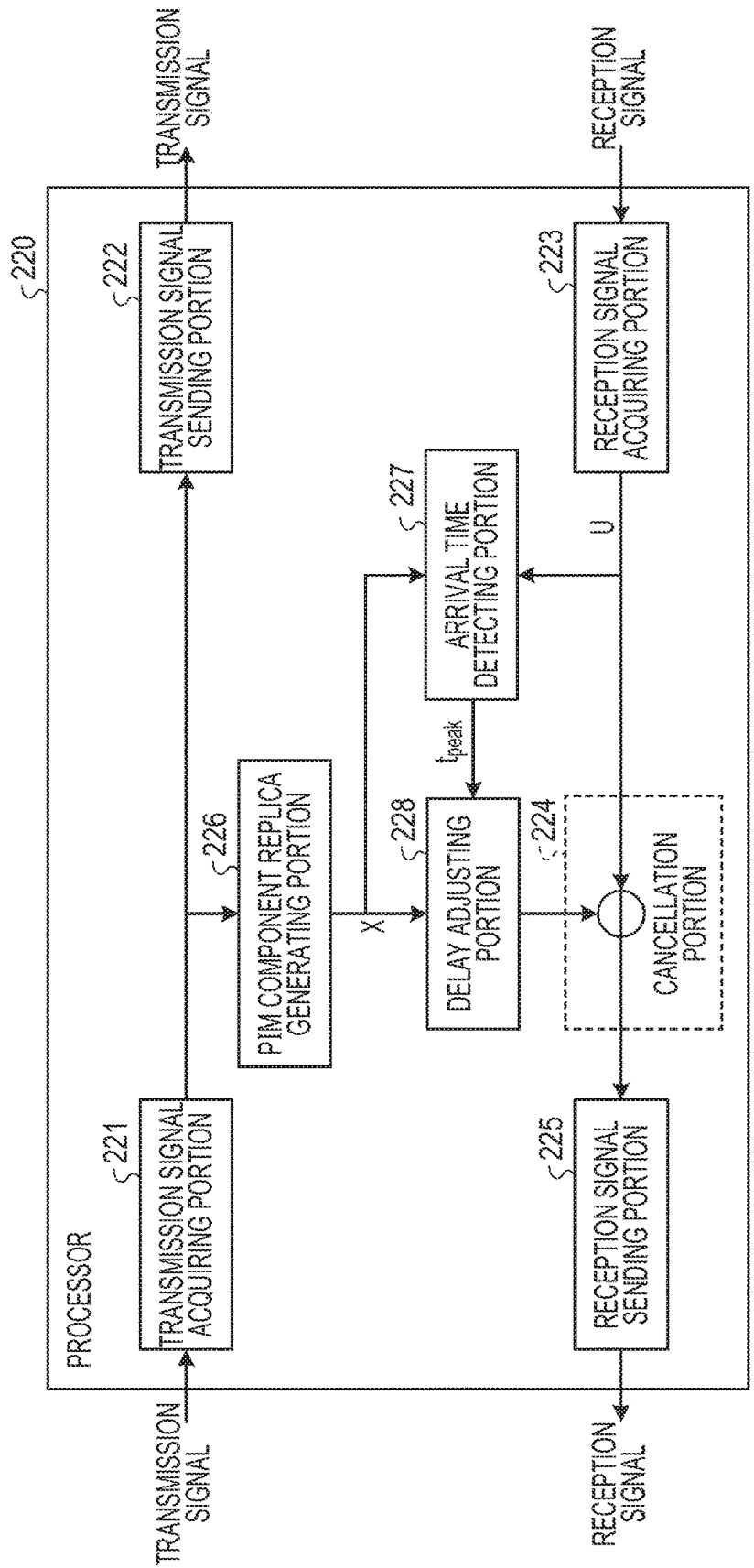
FIG. 2 is a block diagram illustrating one example of functions of a processor of a cancellation device in the wireless communication system according to the embodiment.

FIG. 2 is a block diagram illustrating functions of the processor 220 of the cancellation device 200 in the wireless communication system according to the embodiment.

The processor 220 includes a transmission signal acquiring portion 221, a transmission signal sending portion 222, a reception signal acquiring portion 223, a cancellation portion 224, a reception signal sending portion 225, a PIM component replica generating portion 226, an arrival time detecting portion 227, and a delay adjusting portion 228.

Figure 3:
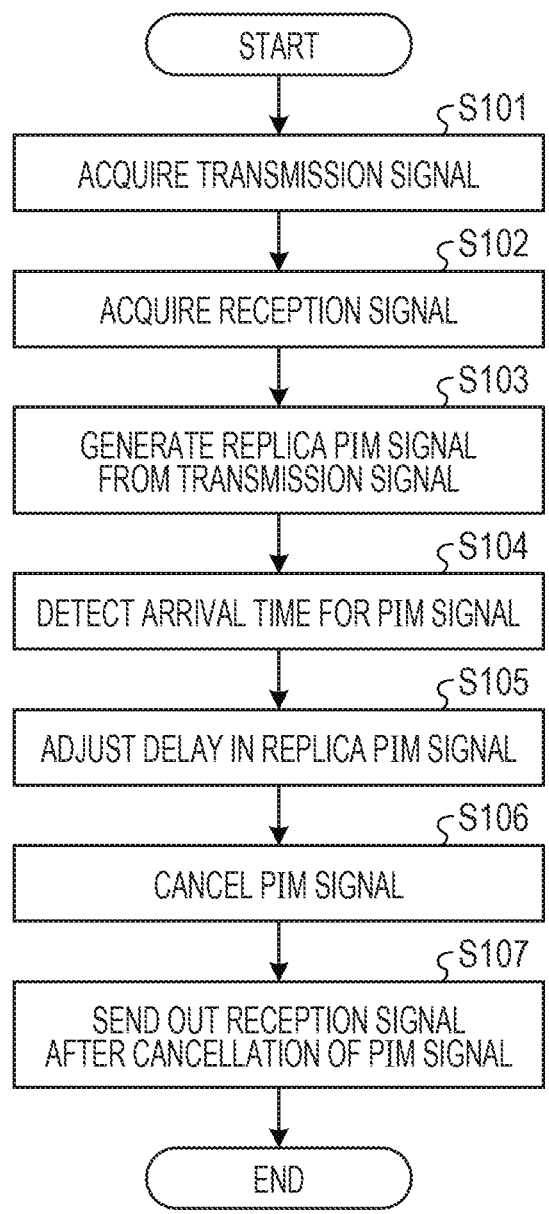
FIG. 3 is a flowchart illustrating one example of a distortion cancellation process by the cancellation device in the wireless communication system according to the embodiment.

A process (a distortion cancellation process) by functions of the cancellation device 200 will be described with reference to FIG. 3. FIG. 3 is a flowchart illustrating one example of the distortion cancellation process by the cancellation device 200 in the wireless communication system according to the embodiment.

The transmission signal acquiring portion 221 acquires transmission signals received from the REC 100 via the interface 210 (operation S101). That is, the transmission signal acquiring portion 221 acquires transmission signals Tx1, Tx2, Tx3, and Tx4.

The transmission signal sending portion 222 sends out the transmission signals acquired by the transmission signal acquiring portion 221 to the REs 300a and 300b via the interface 240. More specifically, the transmission signal sending portion 222 sends out the transmission signals Tx1 and Tx2 to the RE 300a and sends out the transmission signals Tx3 and Tx4 to the RE 300b.

The reception signal acquiring portion 223 acquires reception signals U received from the REs 300a and 300b via the interface 240 (operation S102). A PIM signal X which is generated due to intermodulation between transmission signals Tx1 and Tx2 has been added to each of the reception signals U acquired by the reception signal acquiring portion 223.

The PIM component replica generating portion 226 generates a PIM signal X as a replica (replica PIM signal X) from the transmission signals Tx1 and Tx2 acquired by the transmission signal acquiring portion 221 (operation S103). The PIM component replica generating portion 226 sends out the replica PIM signal X to the arrival time detecting portion 227 and the delay adjusting portion 228.

The arrival time detecting portion 227 computes a correlation value R(t) by expression (2) for a sliding correlation operation using the replica PIM signal X and a reception signal U. The arrival time detecting portion 227 sets, as an arrival time for a PIM signal X, a time $t_{peak}$ when the correlation value R(t) has a significant peak value (operation S104). Functions of the arrival time detecting portion 227 will be described later in detail.

$$R(t) = \left| \sum_{s=0}^{N} U \overline{X(t)} \right|^2 \quad (2)$$

The delay adjusting portion 228 adjusts a delay in the replica PIM signal X based on the arrival time $t_{peak}$ (operation S105). The delay-adjusted replica PIM signal X is sent out to the cancellation portion 224.

The cancellation portion 224 cancels the PIM signal X added to the reception signal U acquired by the reception signal acquiring portion 223 by adding a signal obtained by inverting the phase of the replica PIM signal X delay-adjusted by the delay adjusting portion 228 to the reception signal U (operation S106). For example, the cancellation portion 224 includes a subtractor, and the subtractor subtracts the replica PIM signal X delay-adjusted by the delay adjusting portion 228 from the reception signal U acquired by the reception signal acquiring portion 223.

The reception signal sending portion 225 sends out the reception signal U after the cancellation of the PIM signal X to the REC 100 via the interface 210 (operation S107).

[Outline of Present Disclosure]

The outline of the present disclosure will be described before describing the functions of the arrival time detecting portion 227.

In a sliding correlation operation, there are fluctuations in the strength of correlation dependent on a sampling period in addition to a correlation between a PIM signal X and a reception signal U. The fluctuations serve as an error component. In the wireless communication system according to the reference example, a sampling period (a time interval for the cumulative value s) is made to coincide with a delay unit (a time interval for the delay amount t).

More specifically, in the wireless communication system according to the reference example, for example, 0th to N-th PIM signals X written in the storage portion 1501 are brought into synchronization with 0th to N-th reception signals U written in the storage portion 1504. Similarly, 1st to (N+1)-th PIM signals X written in the storage portion 1501 are brought into synchronization with the 0th to N-th reception signals U written in the storage portion 1504. Similarly, W-th to (N+W)-th PIM signals X written in the storage portion 1501 are brought into synchronization with the 0th to N-th reception signals U written in the storage portion 1504. In this manner, the wireless communication system according to the reference example avoids generation of the above-described error.

However, it is widely known that signals with a sufficiently large time difference have almost no correlation. According to the principle, a sampling-period-dependent change in correlation is curbed by making a sampling period sufficiently long, that is, by coarse sampling, which allows avoidance of generation of the above-described error.

The wireless communication system according to the embodiment focuses on the above-described respect and performs the same correlation operation as the wireless communication system according to the reference example without holding continuous signals (PIM signals X and reception signals U) as in the reference example.

More specifically, the wireless communication system according to the embodiment uses signal samples sufficiently widely separated in time. With this method, one sample of a reception signal U at a given time and a sample of a signal sequence of PIM signals X having a duration corresponding to a detection range (a set delay amount W), for which a correlation is desired, are held in the wireless communication system according to the embodiment. That is, in the wireless communication system according to the embodiment, samples in operation S1201 described earlier are not held, and samples in operation S201 (to be described later) are held. In the wireless communication system according to the embodiment, a signal sequence of the correlation value R(t) (t=0 to W) is generated by sliding correlation operations using a sample of a signal sequence of PIM signals X and one sample of the reception signal U. That is, correlation values R(0) to R(W) are computed. For this reason, the wireless communication system according to the embodiment allows minimization of the storage size of a storage portion which holds samples and a reduction in circuit size.

In the wireless communication system according to the embodiment, the process of computing the correlation values R(0) to R(W) is repeated a set number (a set cumulative value N) of times. That is, in the wireless communication system according to the embodiment, the order in which the correlation values R(0) to R(W) are computed is changed from the order in operations S1204 to S1207 described earlier to order in operations S204 to S207 (to be described later). As described earlier, in the wireless communication system according to the reference example, the storage sizes of the storage portions 1501 and 1504 increase with an increase in the set cumulative value N, and the device circuit size increases. In contrast, in the wireless communication system according to the embodiment, it is possible to minimize the storage size of a storage portion which holds samples while keeping the time for computation of the correlation values R(0) to R(W) low as in the reference example, by changing the order in which the correlation values R(0) to R(W) are computed.

[Arrival Time Detecting Portion]

Figure 4:
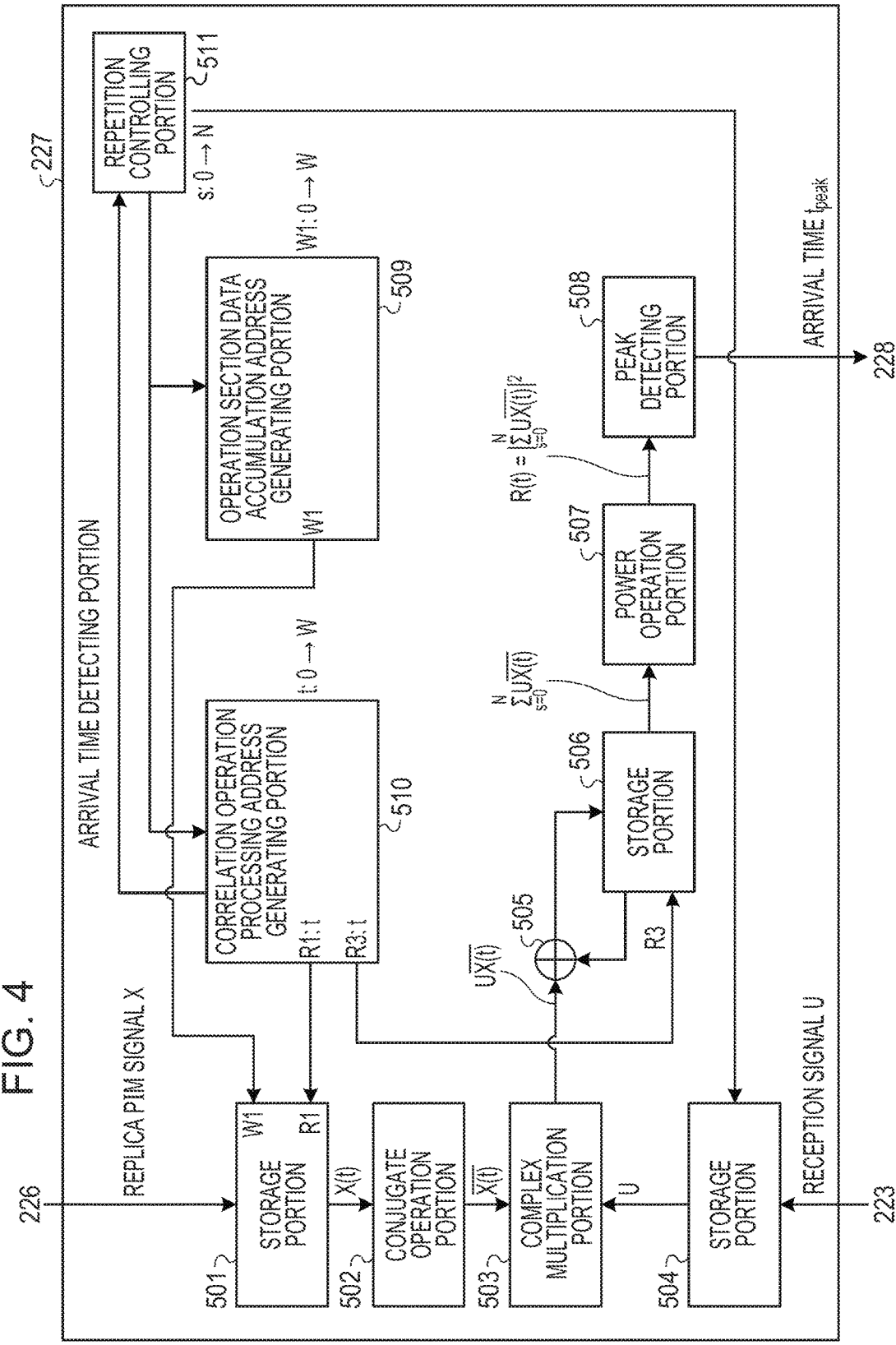
FIG. 4 is a block diagram illustrating one example of an arrival time detecting portion of the cancellation device in the wireless communication system according to the embodiment.

FIG. 4 is a block diagram illustrating one example of the arrival time detecting portion 227 of the cancellation device 200 in the wireless communication system according to the embodiment.

The arrival time detecting portion 227 includes storage portions 501, 504, and 506, a conjugate operation portion 502, a complex multiplication portion 503, an adder 505, a power operation portion 507, and a peak detecting portion 508. The arrival time detecting portion 227 also includes an operation section data accumulation address generating portion 509, a correlation operation processing address generating portion 510, and a repetition controlling portion 511. The storage portions 501 and 506 are, for example, random access memories (RAMs), and the storage portion 504 is, for example, a register. Although the separate storage portions 501, 504, and 506 are used as a storage portion for convenience of illustration, a plurality of storage portions do not have to be provided, and one storage portion may be provided.

Figure 5:
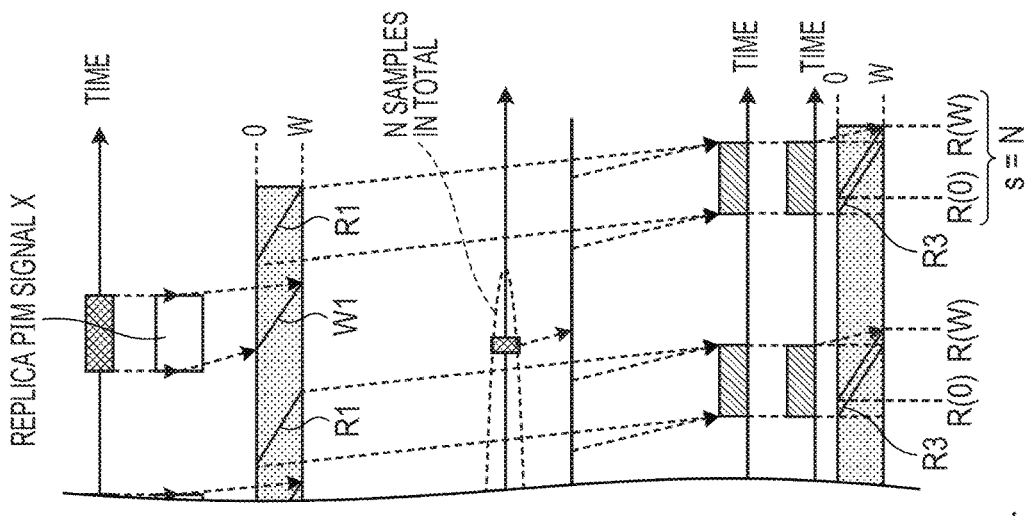
FIG. 5 is a timing diagram illustrating one example of an arrival time detection process according to the embodiment.
Figure 6:
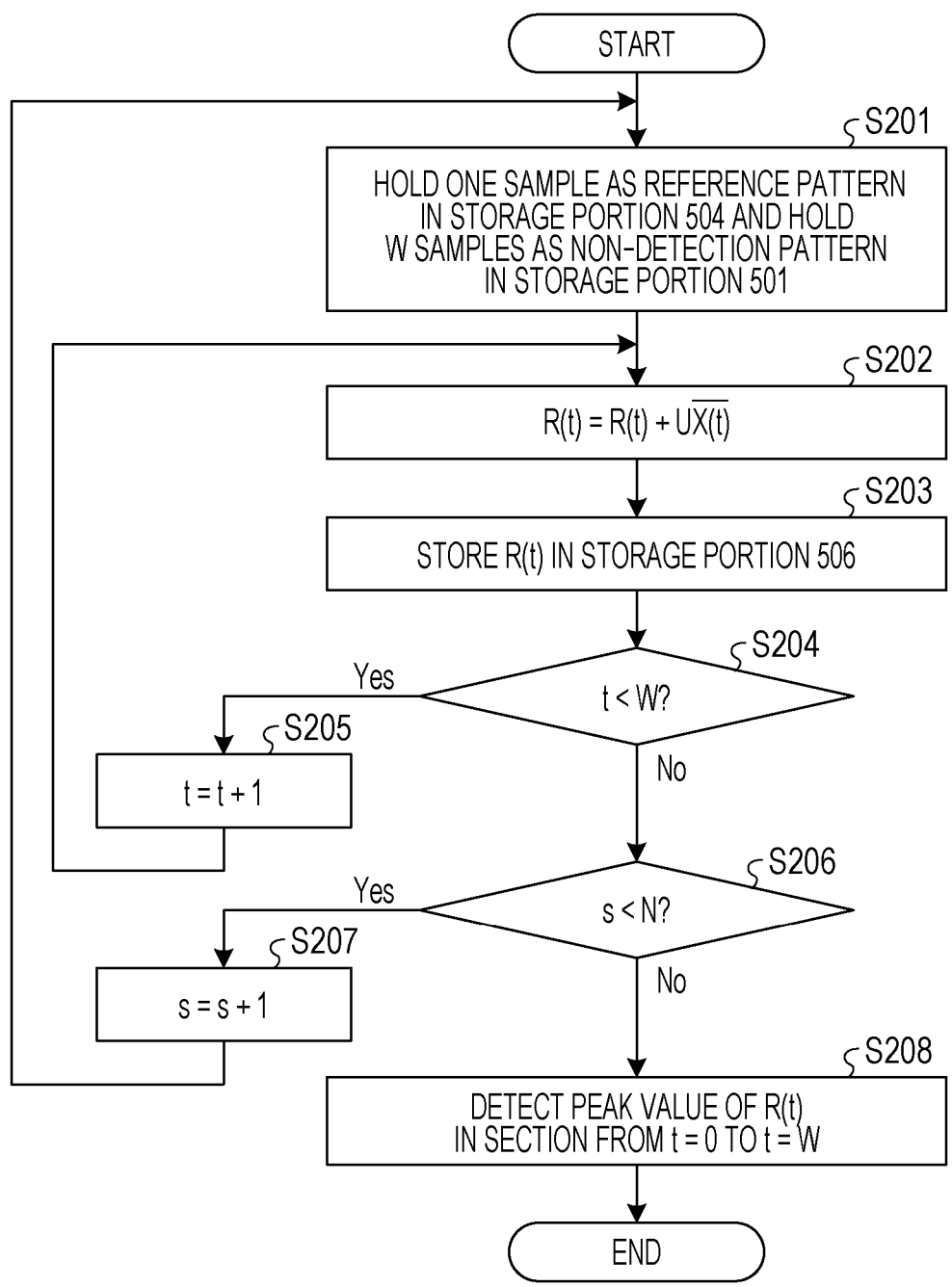
FIG. 6 is a flowchart illustrating the one example of the arrival time detection process according to the embodiment.

A process (an arrival time detection process) by the components of the arrival time detecting portion 227 will be described with reference to FIGS. 5 and 6. FIG. 5 is a timing diagram illustrating one example of the arrival time detection process according to the embodiment. FIG. 6 is a flowchart illustrating the one example of the arrival time detection process according to the embodiment.

First, the arrival time detecting portion 227 holds W samples as a non-detection pattern in the storage portion 501 and holds one sample as a reference pattern in the storage portion 504 (operation S201).

More specifically, in operation S201, the repetition controlling portion 511 transmits an s-th control signal to the operation section data accumulation address generating portion 509, the correlation operation processing address generating portion 510, and the storage portion 504. s here denotes a cumulative value representing any one of 0 to N, and an initial value of the cumulative value s is 0. N denotes a set cumulative value.

In operation S201, the operation section data accumulation address generating portion 509 generates, as a write address W1, each of 0th to W-th addresses in accordance with the s-th control signal. The operation section data accumulation address generating portion 509 writes PIM signals X made as replicas (replica PIM signals) by the PIM component replica generating portion 226 as a signal sequence having a duration corresponding to a detection range from a 0th to a W-th into the storage portion 501, using the write address W1. There denotes a delay amount representing any one of 0 to W, and an initial value of the delay amount t is 0. W denotes a set delay amount (the detection range).

In operation S201, the storage portion 504 holds a reception signal U acquired by the reception signal acquiring portion 223. The storage portion 504 outputs the reception signal U in accordance with the s-th control signal.

The arrival time detecting portion 227 then computes a correlation value R(t) by expression (2) for a sliding correlation operation using a t-th replica PIM signal X stored in the storage portion 501 and the reception signal U stored in the storage portion 504 (operation S202).

More specifically, in operation S202, the correlation operation processing address generating portion 510 generates a t-th address as a read address R1. The correlation operation processing address generating portion 510 then reads out the t-th replica PIM signal X among 0th to W-th replica PIM signals X written in the storage portion 501, using the read address R1. Hereinafter, the t-th replica PIM signal X read out from the storage portion 501 will be referred to as a replica PIM signal X(t).

In operation S202, the correlation operation processing address generating portion 510 generates a t-th address as a read address R3. The correlation operation processing address generating portion 510 then reads out the t-th correlation value R(t) from the storage portion 506, using the read address R3.

In operation S202, the conjugate operation portion 502 performs a conjugate operation on the replica PIM signal X(t) read out from the storage portion 501. The complex multiplication portion 503 multiplies the replica PIM signal X(t) subjected to the conjugate operation by the conjugate operation portion 502 and the reception signal U read out from the storage portion 504 and outputs the product to the adder 505.

In operation S202, the adder 505 adds the t-th correlation value R(t) read out from the storage portion 506 to the product output from the complex multiplication portion 503 and updates the correlation value R(t) with the sum.

The storage portion 506 then stores the correlation value R(t) updated by the adder 505 (operation S203).

The correlation operation processing address generating portion 510 then judges whether the delay amount t is smaller than the set delay amount W (operation S204).

If the delay amount t is smaller than the set delay amount W (Yes in operation S204), the correlation operation processing address generating portion 510 increments the delay amount t by 1 (operation S205). In this case, operations S202 to S204 described above are performed.

On the other hand, if the delay amount t is equal to the set delay amount W (No in operation S204), a signal sequence of the correlation value R(t) (t=0 to W) when s=0, that is, correlation values R(0) to R(W) when s=0 are computed, as illustrated in, for example, FIG. 5. In this case, the correlation operation processing address generating portion 510 gives, to the repetition controlling portion 511, a notification that the delay amount t is equal to the set delay amount W.

Upon receipt of the notification from the correlation operation processing address generating portion 510, the repetition controlling portion 511 judges whether the cumulative value s is smaller than the set cumulative value N (operation S206).

If the cumulative value s is smaller than the set cumulative value N (Yes in operation S206), the repetition controlling portion 511 increments the cumulative value s by 1 (operation S207). In this case, operations S201 to S206 described above are performed.

On the other hand, if the cumulative value s is equal to the set cumulative value N (No in operation S206), a signal sequence of the correlation value R(t) (t=0 to W) when s=N, that is, the correlation values R(0) to R(W) when s=N are computed, as illustrated in, for example, FIG. 5. In this case, an arrival time for a PIM signal X is detected (operation S208).

More specifically, in operation S208, the power operation portion 507 obtains an absolute value of each element of a signal sequence of the correlation value R(t) (t=0 to W) written in the storage portion 506, that is, each of the correlation values R(0) to R(W) and calculates the power of the absolute value. The peak detecting portion 508 detects, as the arrival time for a PIM signal X, a time $t_{peak}$ corresponding to the correlation value R(t) having a significant peak value among the correlation values R(0) to R(W) in a section from t=0 to t=W (the detection range).

For this reason, the delay adjusting portion 228 adjusts a delay in a PIM signal X made as a replica (replica PIM signal) based on an arrival time $t_{peak}$. The cancellation portion 224 then cancels a PIM signal X added to a reception signal U acquired by the reception signal acquiring portion 223 by adding a signal obtained by inverting the phase of the replica PIM signal X delay-adjusted by the delay adjusting portion 228 to the reception signal U.

Effects of Embodiment

As seen from the above description, a distortion cancellation device (the cancellation device 200) in the wireless communication system according to the embodiment includes the transmission signal acquiring portion 221, the reception signal acquiring portion 223, a replica generating portion, the arrival time detecting portion 227, and the cancellation portion 224. The replica generating portion corresponds to the PIM component replica generating portion 226 according to the embodiment. The transmission signal acquiring portion 221 acquires a transmission signal to be wirelessly transmitted. The reception signal acquiring portion 223 acquires a reception signal U, to which an intermodulation signal (a PIM signal X) generated due to transmission signals is added. The replica generating portion makes a PIM signal X as a replica (replica PIM signal) from transmission signals. The arrival time detecting portion 227 performs a sliding correlation operation using a sample of a signal sequence of a PIM signal X(t) (t=0 to W) made as a replica by the replica generating portion, having a duration corresponding to a detection range, and one sample of a reception signal U acquired by the reception signal acquiring portion 223. The arrival time detecting portion 227 detects an arrival time $t_{peak}$ for the PIM signal X(t) based on sliding correlation operations. The cancellation portion 224 cancels a PIM signal X in a reception signal U based on the arrival time $t_{peak}$.

In the wireless communication system according to the embodiment, the arrival time detecting portion 227 includes a correlation operation processing portion, the repetition controlling portion 511, and the peak detecting portion 508. The correlation operation processing portion corresponds to the correlation operation processing address generating portion 510, the conjugate operation portion 502, the complex multiplication portion 503, and the adder 505 according to the embodiment. The correlation operation processing portion performs a sliding correlation operation using a sample of a signal sequence of the PIM signal X(t) (t=0 to W) made as a replica (replica PIM signal by the replica generating portion, having a duration corresponding to the detection range and one sample of a reception signal U acquired by the reception signal acquiring portion 223. The correlation operation processing portion generates a signal sequence of a correlation value R(t) (t=0 to W) by sliding correlation operations. The repetition controlling portion 511 repeats the processing to be executed by the correlation operation processing portion a set number (the set cumulative value N) of times. If the processing by the correlation operation processing portion is repeated the set number (the set cumulative value N) of times, the peak detecting portion 508 detects, as an arrival time for a PIM signal X, the time $t_{peak}$ corresponding to the correlation value R(t) having a peak value among the signal sequence of the correlation value R(t) (t=0 to W).

As described above, in the wireless communication system according to the embodiment, the order in which correlation values R(0) to R(W) are computed is changed from the order in operations S1204 to S1207 described earlier to the order in operations S204 to S207 described above. More specifically, as described earlier, in the wireless communication system according to the reference example, the storage sizes of the storage portions 1501 and 1504 increase with an increase in the set cumulative value N, and device circuit size increases. In contrast, in the wireless communication system according to the embodiment, it is possible to minimize the storage size of a storage portion which holds samples while keeping the time for computation of the correlation values R(0) to R(W) low as in the reference example, by changing the order in which the correlation values R(0) to R(W) are computed.

In the wireless communication system according to the embodiment, the arrival time detecting portion 227 further includes first and second storage portions and an operation section data accumulating portion. The first and second storage portions correspond to the storage portions 501 and 504, respectively, according to the embodiment. The operation section data accumulating portion corresponds to the operation section data accumulation address generating portion 509 according to the embodiment. The operation section data accumulating portion stores a sample of a signal sequence of the PIM signal X(t) (t=0 to W) made as a replica (replica PIM signal by the replica generating portion, having a duration corresponding to the detection range in the first storage portion. The operation section data accumulating portion stores one sample of a reception signal U acquired by the reception signal acquiring portion 223 in the second storage portion. The correlation operation processing portion generates a signal sequence of the correlation value R(t) (t=0 to W) by sliding correlation operations using a sample of a signal sequence of the replica PIM signal X(t) (t=0 to W) stored in the first storage portion and one sample of a reception signal U stored in the second storage portion. The repetition controlling portion 511 repeats the processing to be executed by the operation section data accumulating portion and the correlation operation processing portion the set number (the set cumulative value N) of times. If the processing by the operation section data accumulating portion and the correlation operation processing portion is repeated the set number (the set cumulative value N) of times, the peak detecting portion 508 detects, as an arrival time for a PIM signal X, the time $t_{peak}$ corresponding to the correlation value R(t) having a peak value among the signal sequence of the correlation value R(t) (t=0 to W).

As described above, in the wireless communication system according to the embodiment, a sample of a signal sequence of replica PIM signals X having a duration corresponding to a detection range (the set delay amount W), for which a correlation is desired, are held in the first storage portion, and one sample of a reception signal U at a given time is held in the second storage portion. That is, in the wireless communication system according to the embodiment, samples in operation S1201 described earlier are not held, and samples in operation S201 described above are held. In the wireless communication system according to the embodiment, a signal sequence of the correlation value R(t) (t=0 to W) is generated by sliding correlation operations using a sample of a signal sequence of replica PIM signals X and one sample of a reception signal U. For this reason, the wireless communication system according to the embodiment allows minimization of the storage size of a storage portion which holds samples and a reduction in circuit size.

Note that although a distortion cancellation process is executed by the processor 220 of the cancellation device 200 in the embodiment, the cancellation device 200 does not have to be arranged as an independent device. That is, for example, the processor 110 of the REC 100 may have functions of the processor 220 of the cancellation device 200. A processor having the same functions as the processor 220 may be provided in the RE 300a or the RE 300b.

The distortion cancellation process described in the embodiment may be described as a computer-executable program. In this case, the program may be stored in a computer-readable recording medium and be introduced into a computer. Examples of the computer-readable recording medium include portable recording media, such as a CD-ROM, a DVD disk, and a USB memory, and semiconductor memories, such as a flash memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A distortion cancellation device comprising:
a memory; and
a processor coupled to the memory and the processor configured to:
acquire a transmission signal to be wirelessly transmitted,
acquire a reception signal to which an intermodulation signal generated due to the transmission signal wirelessly transmitted is added,
generate a replica signal of the intermodulation signal from the transmission signal,
detect an arrival time of the intermodulation signal, based on a correlation operation using a sample of a signal sequence of the replica signal and a sample of the acquired reception signal, the signal sequence having a duration corresponding to a detection range, and
cancel the intermodulation signal in the reception signal, based on the detected arrival time.

2. The distortion cancellation device according to claim 1, wherein the processor is further configured to:
generate a signal sequence of a correlation value by the correlation operation,
repeat the generating the signal sequence of the correlation value a set number of times, and
detect, as the arrival time, a time corresponding to a correlation value having a peak value among the signal sequence of the correlation value if the generating the signal sequence of the correlation value is repeated the set number of times.

3. The distortion cancellation device according to claim 2, wherein the processor is further configured to:
store, in the memory, the one sample of the acquired reception signal and the sample of the signal sequence of the replica signal, the signal sequence having the duration corresponding to the detection range,
generate the signal sequence of the correlation value by the correlation operation using the sample of the signal sequence of the replica signal stored in the memory and the one sample of the reception signal stored in the memory,
repeat the storing the sample of the signal sequence and the one sample, and processing of generating the signal sequence of the correlation value, the set number of times, and
detect the arrival time if the storing the sample of the signal sequence and the one sample and the generating the signal sequence of the correlation value are repeated the set number of times.

4. A distortion cancellation method comprising:
acquiring a transmission signal to be wirelessly transmitted;
acquiring a reception signal to which an intermodulation signal generated due to the transmission signal wirelessly transmitted is added;
generating a replica signal of the intermodulation signal from the transmission signal;
detecting an arrival time of the intermodulation signal, based on a correlation operation using a sample of a signal sequence of the replica signal and a sample of the acquired reception signal, the signal sequence having a duration corresponding to a detection range; and
canceling the intermodulation signal in the reception signal, based on the detected arrival time.

5. A distortion cancellation device comprising:
a memory storing instructions;
a processor coupled to the memory; and
an interface in communication with the processor and external devices that are external of the cancellation device, the processor configured to execute the instructions causing a process of:
receiving a transmission signal to be wirelessly transmitted;
receiving a reception signal to which an intermodulation signal generated due to the transmission signal wirelessly transmitted is added, from an external device of the external devices via the interface;
generating a replica signal of the intermodulation signal from the transmission signal;
detecting an arrival time of the intermodulation signal;
adjusting a delay in the replica signal; and
canceling the intermodulation signal in the reception signal, based on the detected arrival time.

6. The distortion cancellation device according to claim 5, wherein the process further includes transmitting the reception signal to another external device of the external devices via the interface after the canceling.

7. The distortion cancellation device according to claim 5, wherein the canceling includes adding a signal obtained by inverting a phase of the replica signal to the reception signal.

8. The distortion cancellation device according to claim 5, wherein the detecting detects the arrival time using a formula of:

$$R(t) = \left| \sum_{s=0}^{N} U \overline{X(t)} \right|^2. \quad (2)$$

* * * * *